(12) United States Patent
Liu et al.

(10) Patent No.: US 11,506,886 B2
(45) Date of Patent: Nov. 22, 2022

(54) SPATIAL IMAGE DISPLAY TOUCH DEVICE (71) Applicant: EMERGING DISPLAY TECHNOLOGIES CORP., Kaohsiung (TW)

(72) Inventors: Po-Tsun Liu, Kaohsiung (TW); Chao-Ping Wu, Kaohsiung (TW)

(73) Assignee: EMERGING DISPLAY TECHNOLOGIES CORP., Kaohsiung (TW)

( * ) Notice: Subject to any disclaimer, the term of this patent is extended or adjusted under 35 U.S.C. 154(b) by 0 days.

(21) Appl. No.: 17/509,817

(22) Filed: Oct. 25, 2021

(65) Prior Publication Data
US 2022/0317441 A1    Oct. 6, 2022

(30) Foreign Application Priority Data
Mar. 31, 2021 (TW) ................. 110203498

(51) Int. Cl.
*G02B 27/00* (2006.01)
*G02B 30/56* (2020.01)
*G02B 17/00* (2006.01)
*G06F 3/042* (2006.01)
*G01S 17/08* (2006.01)
*G02B 1/10* (2015.01)

(52) U.S. Cl.
CPC .......... *G02B 27/0018* (2013.01); *G01S 17/08* (2013.01); *G02B 1/10* (2013.01); *G02B 17/002* (2013.01); *G02B 17/006* (2013.01); *G02B 30/56* (2020.01); *G06F 3/0421* (2013.01)

(58) Field of Classification Search
CPC ... G06F 3/0421; G02B 27/0018; G02B 30/56; G02B 1/10; G02B 17/002; G02B 17/006; G01S 17/08
USPC ........................................ 345/175
See application file for complete search history.

(56) References Cited

U.S. PATENT DOCUMENTS

| | | | | |
|---|---|---|---|---|
| 2010/0110384 A1* | 5/2010 | Maekawa | ............. | G03B 35/18 353/10 |
| 2014/0240228 A1* | 8/2014 | Juni | ..................... | G06F 3/0304 345/156 |
| 2017/0013256 A1* | 1/2017 | Juni | ..................... | G02B 30/56 |
| 2018/0011605 A1* | 1/2018 | Otsubo | ................ | G06F 3/0421 |

* cited by examiner

*Primary Examiner* — Jimmy H Nguyen
(74) *Attorney, Agent, or Firm* — Birch, Stewart, Kolasch & Birch, LLP (57) ABSTRACT

A spatial image display touch device includes an imaging element, a display, an optical film and a sensor unit. The imaging element and the display are retained in a housing and inclined to each other. The display generates an image light passing through the imaging element to form a spatial image. The optical film, composed of a plurality of micro-grids arranged in a matrix, is attached on the display. The sensor unit is mounted in the housing to detect an object appearing at the position wherein the spatial image is displayed. By arranging the optical film in front of the display, only the spatial image is visible and the problem of ghost images is avoided.

11 Claims, 7 Drawing Sheets

SPATIAL IMAGE DISPLAY TOUCH DEVICE

BACKGROUND OF THE INVENTION

1. Field of the Invention

The invention is related to a touch device, particularly to a spatial image display touch device that mitigates the problem of ghost images.

2. Description of the Related Art

Spatial images can be generated by holographic projection technology which allows users to see 3D images projected to the air. The spatial images are usually applied for 3D demonstration.

Figure 6:
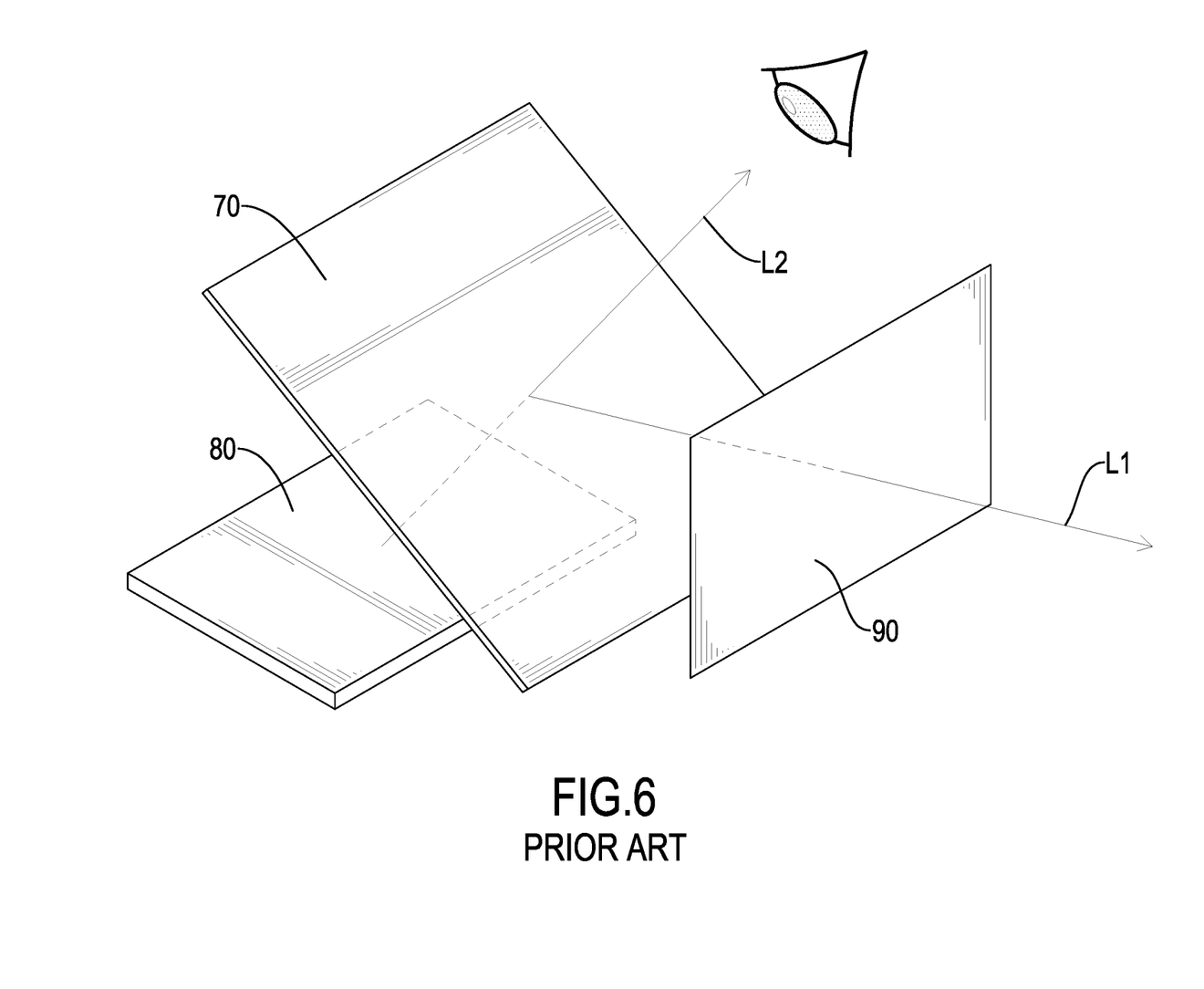
FIG. 6 shows a conventional spatial image display device, wherein the appearance of the display is visible through the imaging element.

In Taiwan patent no. 1654445, a spatial image display device with touch function is disclosed. With reference to FIG. 6, a display 80 is disposed beside and inclined relative to an imaging element 70 in a casing (not shown). When the display generates an image (as indicated by image light L1), the image light L1 is incident on one side of the imaging element 70 and then reflected by the imaging element 70 to produce a floating image 90 visible at another side of the imaging element 70.

However, the image light L1 from the display 80 may further directly pass through the imaging element 70 and be seen as indicated by L2. When an observer looks at the display 80 through a window of the casing, the appearance of the display 80 is visible to cause a problem of poor visual sensation.

Figure 7:
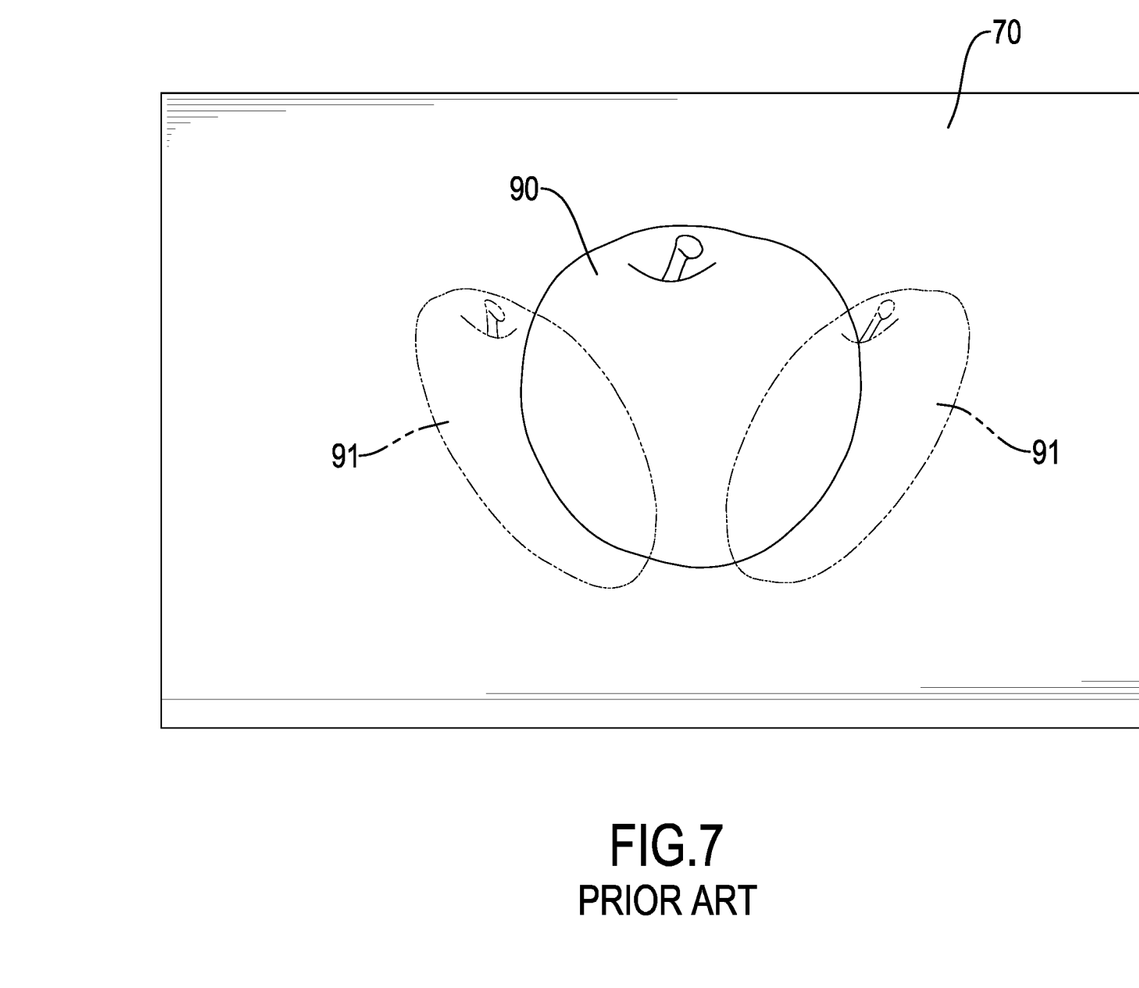
FIG. 7 shows ghost images next to a floating image.

With further reference to FIG. 7, ghost images 91 next to the floating image 90 may also occur and overlap the floating image 91. The overlap problem will affect and blur the appearance of the floating image 90.

SUMMARY OF THE INVENTION

An objective of the present invention is to provide a spatial image display touch device that uses an optical film to eliminate the ghost images and avoid the problem that the user may directly observe the appearance of the display.

To achieve the objective, the spatial image display includes:

a housing defining a space therein and having a display window formed through a surface of the housing;

an imaging element retained in the space of the housing and attached to the display window, the imaging element comprising a substrate having a plurality of openings disposed in a matrix on the substrate, with each opening provided with a dihedral corner reflector consisting of a first reflecting element and a second reflecting element respectively arranged on two adjacent side surfaces of the opening, wherein the first reflecting element and the second reflecting element face toward a first direction and a second direction respectively;

a display mounted in the space of the housing and being inclined relative to the imaging element at an angle, the display having a display surface facing toward the imaging element and configured to display an image light, the image light passing through the imaging element to form a spatial image at a positon being plane-symmetric to the imaging element;

an optical film attached on the display surface of the display and being composed of a plurality of micro grids arranged in a matrix; and a sensor unit mounted in the space of the housing and emitting a sensing light toward the spatial image, wherein the sensing light overlaps a virtual plane where the spatial image is displayed to form a sensing plane; wherein the sensor unit is configured to detect position data of an object in the sensing plane.

By providing the optical film on the display, oblique light from the display can be filtered out by the optical film. Only the image light exiting from the optical film in a specific light-exit angle range can pass through the imaging element to produce a spatial image. Therefore, the ghost images resulted from oblique light of the display is avoided and the appearance of the display is invisible.

Other objectives, advantages and novel features of the invention will become more apparent from the following detailed description when taken in conjunction with the accompanying drawings.

DETAILED DESCRIPTION OF THE INVENTION

Figure 1:
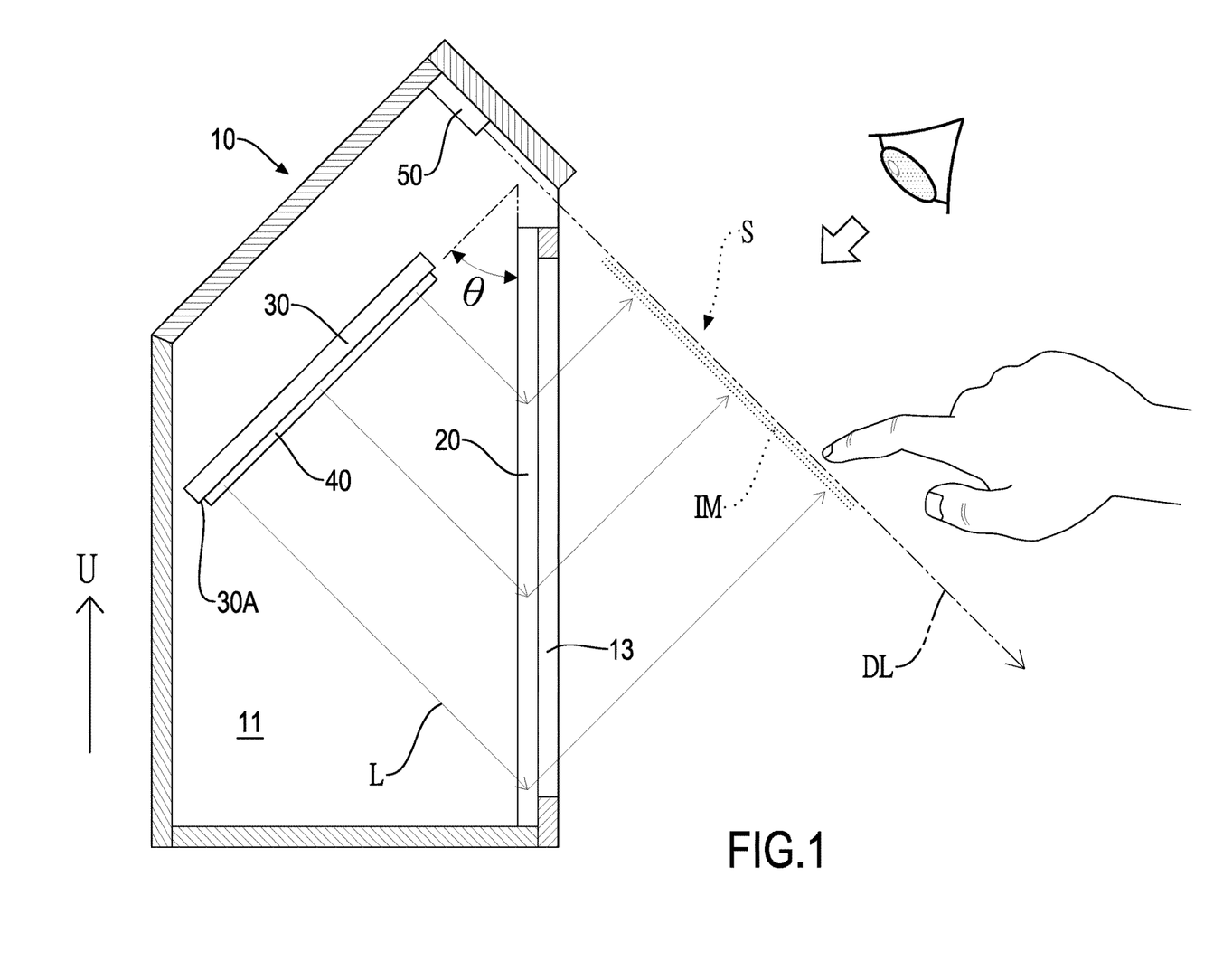
FIG. 1 shows a schematic side view of a spatial image display touch device in accordance with the present invention.

With reference to FIG. 1, a spatial image display touch device in accordance with the present invention comprises a housing 10, an imaging element 20, a display 30, an optical film 40 and a sensor unit 50.

The housing 10 forms a space 11 therein and has a display window 13 defined through a front surface of the housing 10.

Figure 2:
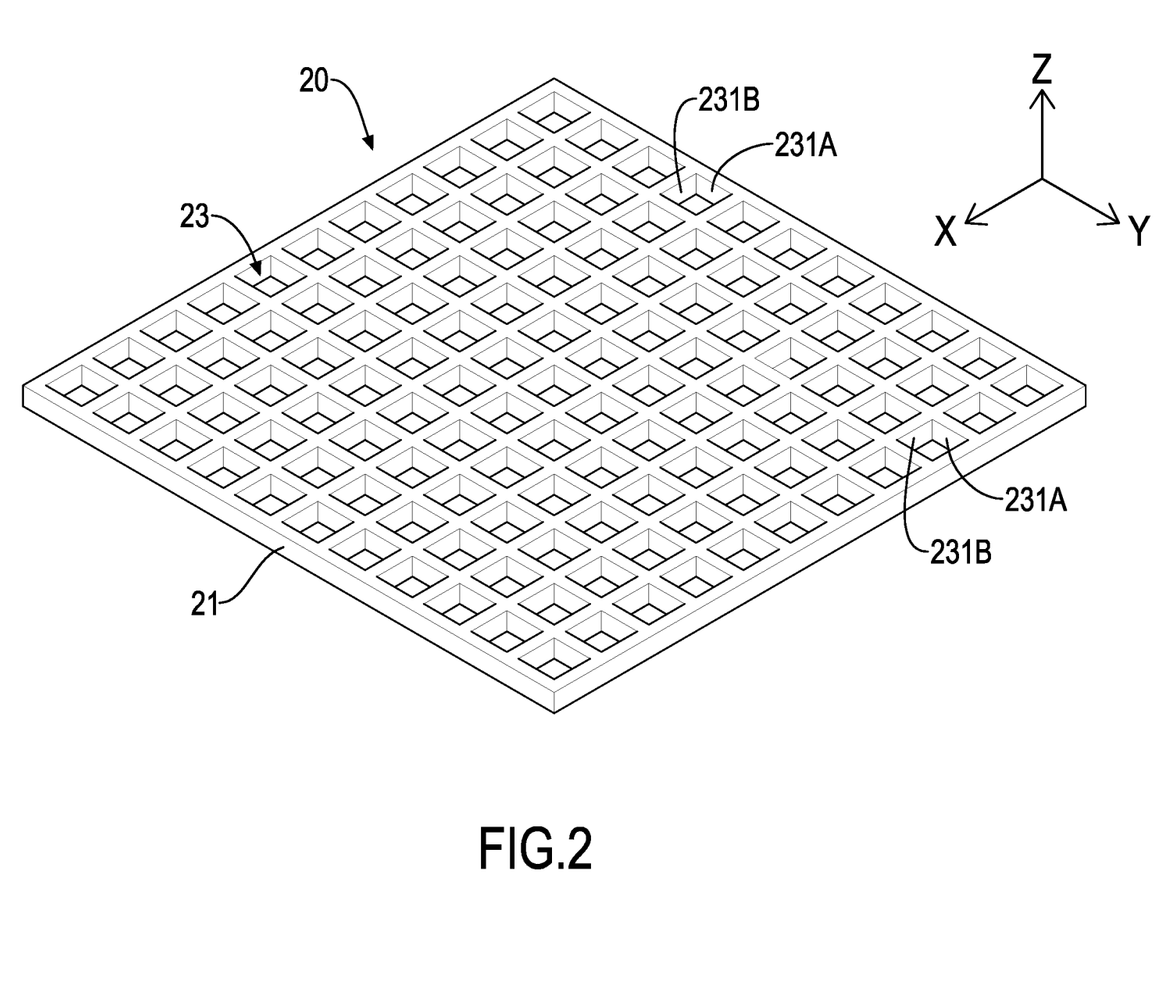
FIG. 2 shows an imaging element of the spatial image display touch device of FIG. 1 in accordance with the present invention.

With further reference to FIG. 2, the imaging element 20 is retained in the space 11 of the housing 10 and attached to the display window 13. The imaging element 20 comprises a substrate 21 having a plurality of openings 23 disposed in a matrix on the substrate 21. Each opening 23 has a rectangular cross-section in an X-Y plane and is formed through the substrate 21 in a thickness direction (Z-axis direction in FIG. 2) of the substrate 21. Each opening 23 is provided with a dihedral corner reflector consisting of a first reflecting element 231A and a second reflecting element 231B respectively arranged on two adjacent side surfaces of a corner in the opening 23. The first reflecting element 231A and the second reflecting element 231B face toward a first direction and a second direction perpendicular to each other. For example, the first direction may be the X-axis direction while the second direction is the Y-axis direction as shown in FIG. 2. When the imaging element 20 is attached to the display window 13, the corner having the first reflecting element 231A and the second reflecting element 231B substantially face upward along a direction U indicated in FIG. 1.

The display 30 is mounted in the space 11 and inclined relative to the imaging element 20 at an angle θ, wherein the preferred angle θ is 45 degrees. The display 30 is configured to display an image on its display surface 30A according to, for example, an image signal from a driving circuit (not shown). The display 30 may be a liquid crystal panel (LCD), an organic light emitted diode panel (OLED), a light emitted diode (LED) panel, etc. An image light L emitted from the display surface 30A and passing through the imaging element 20 forms a real image as a spatial image IM at the positon S which is plane-symmetric to the imaging element 20. Therefore, an included angle (not labeled) between the spatial image IM and the imaging element 20 is the same as the angle θ.

Figure 3:
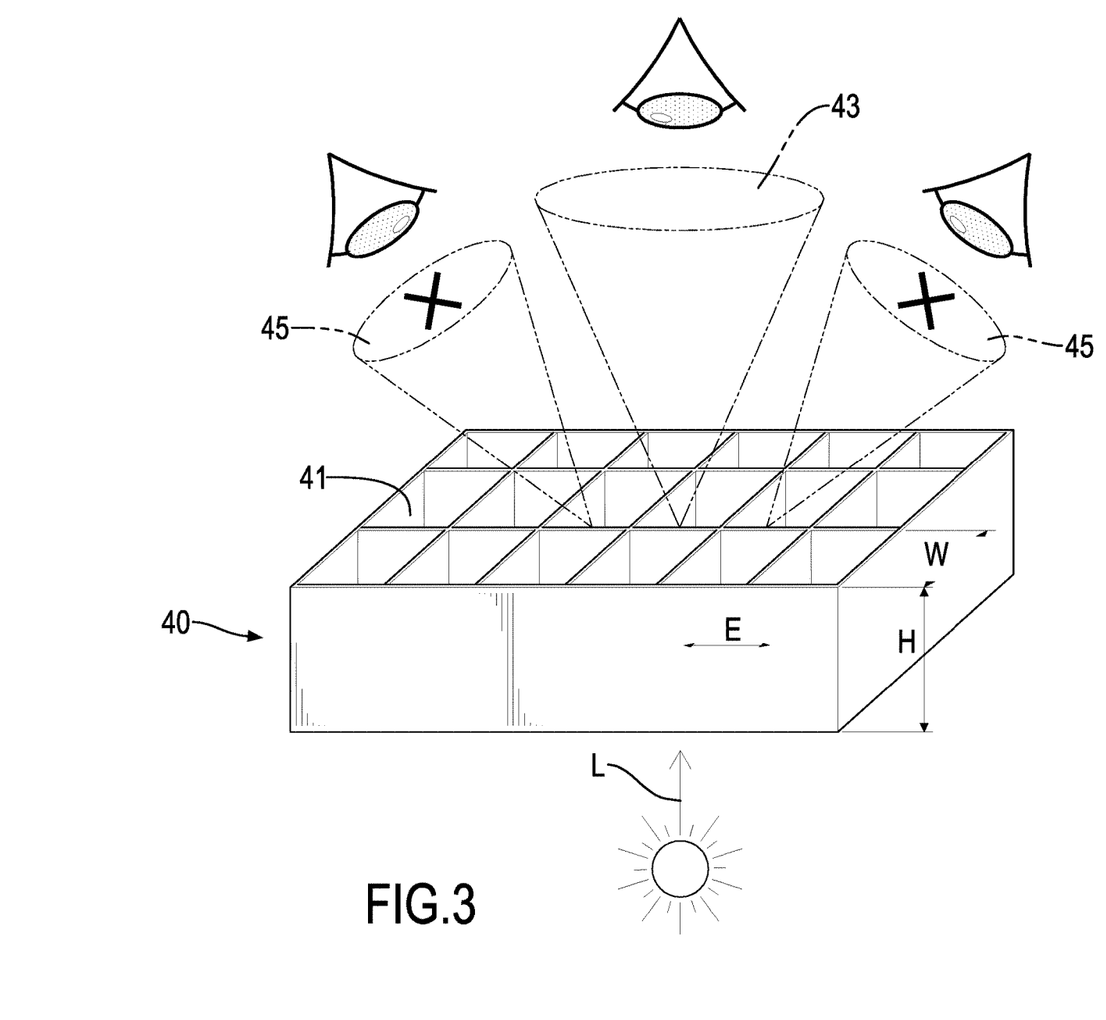
FIG. 3 shows an optical film of the spatial image display touch device of FIG. 1 in accordance with the present invention.
Figure 4:
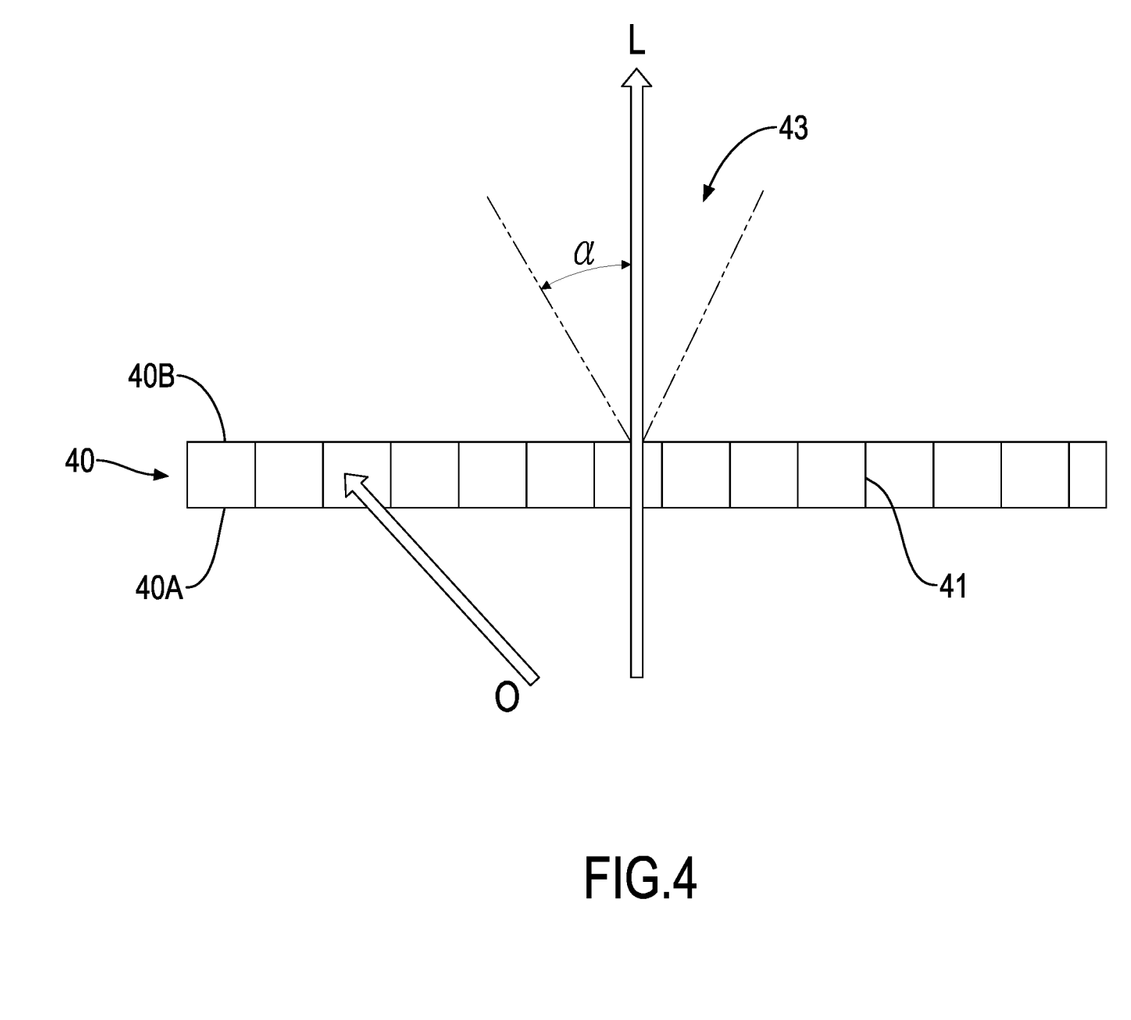
FIG. 4 shows image light L passing through the optical film, while oblique light being filtered out by the optical film.

With further reference to FIGS. 3 and 4, the optical film 40 is provided in front of the display 30 and includes a plurality of micro grids 41 arranged in a matrix. In one embodiment, the optical film 40 is attached on the display surface 30A of the display 30. The optical film 40 has opposite surfaces as an incidence surface 40A and an exit surface 40B respectively. The incidence surface 40A is to be attached on the display surface 30A. The plurality of micro grids 41 allows the image light L incident on the optical film 40 within an incident angle range to pass through the optical film 40. The image light L that exits from the optical film within a light-exit angle can further pass through the imaging element 20 to produce the spatial image IM. But the plurality of micro grids 41 filters out oblique light O inclined to the incidence surface 40A of the optical film 40. Therefore, as shown in FIG. 4, the image light L perpendicularly being incident on the optical film 40 and transmitting through the optical film 40 is visible by an observer in the image-visible region 43, while the oblique light O is blocked by the optical film 40 and is invisible in the light-block region 45. Since the oblique light O has been filtered out, the ghost images resulted from the oblique light O can be eliminated.

As shown in the embodiment of FIG. 4, on the exit surface 40B of the optical film 40, the optical film 40 is configured to have a light-exit angle α between −30 and 30 degrees. The optical film 40 allows the image light L within the light-exit angle to pass through the optical film 40 such that the observer can see the image.

Each grid 41 of the optical film 40 is like a hollow cuboid without a bottom face and a top face in a thickness direction of the optical film 40. The length (E), width (W), and height (H) of the grid 41 are respectively indicated on FIG. 3, where the height (H) represents the length measured in a thickness direction of the optical film 40. Preferably, each grid 41 has its length (E), width (W), and height (H) at the dimension ratio Referring back to FIG. 1, the sensor unit 50 is mounted in the space 11 of the housing 10 above the imaging element 20 and the display 30. The sensor unit 50 emits sensing light DL toward the spatial image IM, wherein the sensing light DL overlaps a virtual plane where the spatial image IM displays to form a sensing plane. The position of an object such as a user's finger appearing in the sensing plane can be detected and determined by the sensor unit 50. The sensing light DL emits outward the housing 10 without passing through the imaging element 20.

In one embodiment, the sensor unit 50 is an infrared sensor unit composed of a plurality of infrared emitters and a plurality of infrared receivers arranged next to each other. The plurality of infrared emitters outputs infrared sensing lights to detect the object in the sensing plane. When the infrared sensing lights are reflected by the object, the plurality of infrared receivers receive the reflected infrared sensing lights. According to time differences between the emission and reception of the infrared sensing lights, the position of the object in the sensing plane can be determined. In another embodiment, the sensor unit 50 can be composed of time of flight (ToF) sensors, the millimeter wave (mm-Wave) radar sensors, etc.

As shown in FIG. 1, the display 30 generates the image light L that passes through the imaging element 20 and is reflected by the reflecting elements 231A as well as the second reflecting elements 231B of the imaging element 20 to form the spatial image IM at the position S which is plane-symmetric to the imaging element 20. Since only the image light L incident on the optical film 40 within an angle range can pass through the optical film 40, other oblique light from the display 30 is blocked by the optical film 40. After the image light L passes through the imaging element 20 to form the spatial image IM, the occurrence of ghost images is avoided and the appearance of the display 30 will not be seen by the observer.

Figure 5:
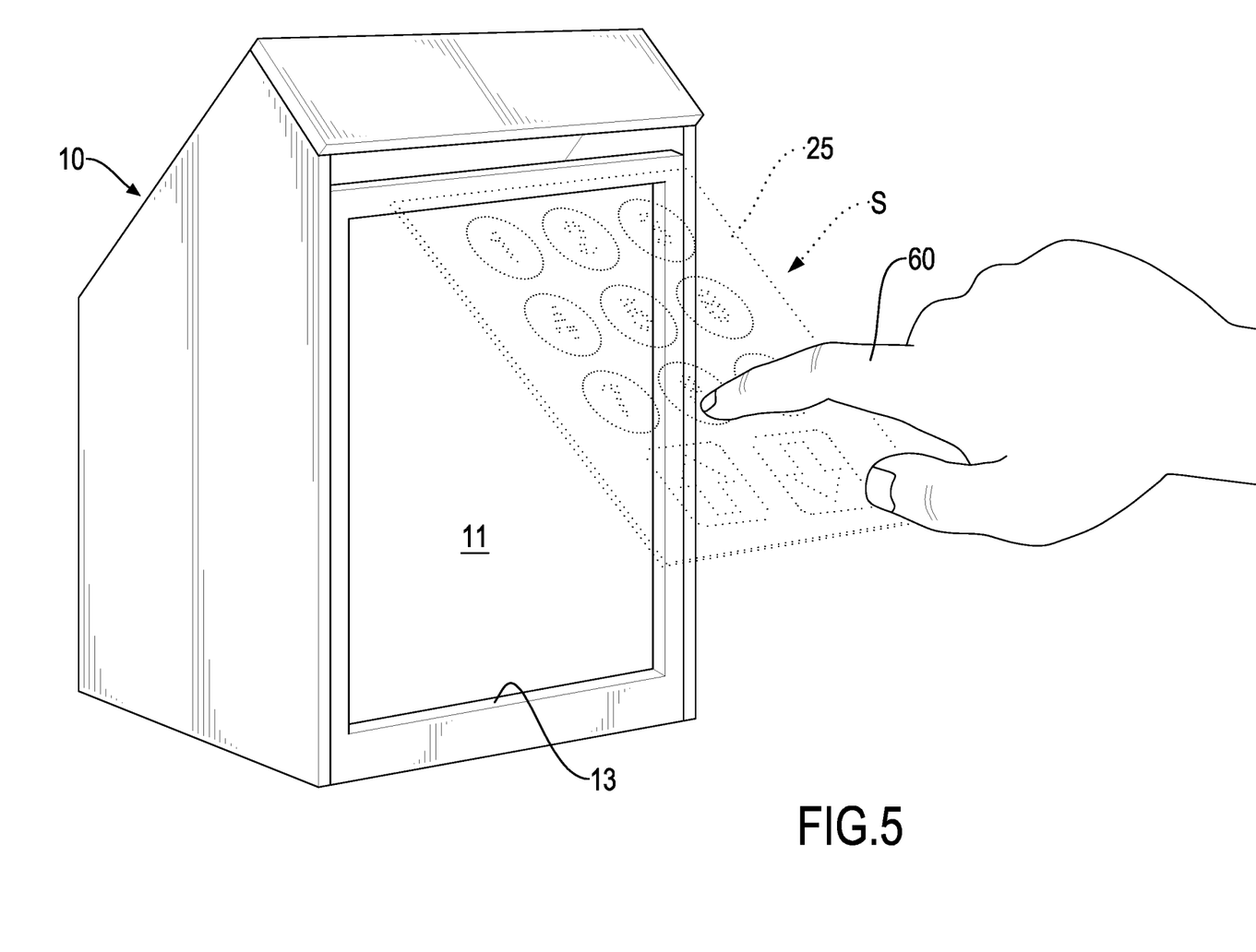
FIG. 5 is an operational view of the spatial image display touch device of FIG. 1 in accordance with the present invention.

An application of the spatial image display touch device is shown in FIG. 5. The observer's finger 60 can point on an icon or pattern of the spatial image IM, and the sensor unit 50 is able to determine the position where the finger 60 points and transmits position data to the display 30. Upon reception of the position data, the display 30 performs respective actions. For example, if the spatial image IM is an image of a numeric keyboard 25, the observer may enter a password "123" by sequentially clicking the numbers "1", "2" and "3". When the sensor unit 50 sequentially detects the presence of the finger 60 at the positions corresponding to the numbers "1", "2" and "3", the position data of the numbers "1", "2" and "3" are transmitted to the display 30. The display 30 receives the position data and recognizes that the password "123" has been entered.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:
1. A spatial image display touch device comprising:
  a housing defining a space therein and having a display window formed through a surface of the housing;
  an imaging element retained in the space of the housing and attached to the display window, the imaging element comprising a substrate having a plurality of openings disposed in a matrix on the substrate, with each opening provided with a dihedral corner reflector consisting of a first reflecting element and a second reflecting element respectively arranged on two adjacent side surfaces of the opening, wherein the first reflecting element and the second reflecting element face toward a first direction and a second direction respectively;
  a display mounted in the space of the housing and being inclined relative to the imaging element at an angle, the display having a display surface facing toward the imaging element and configured to display an image light, the image light passing through the imaging element to form a spatial image at a positon being plane-symmetric to the imaging element;

an optical film attached on the display surface of the display and being composed of a plurality of micro grids arranged in a matrix; and a sensor unit mounted in the space of the housing and emitting a sensing light toward the spatial image, wherein the sensing light overlaps a virtual plane where the spatial image is displayed to form a sensing plane; wherein the sensor unit is configured to detect position data of an object in the sensing plane.

2. The device as claimed in claim 1, wherein each grid of the optical film is a hollow cuboid without opposite faces in a thickness direction of the optical film.

3. The device as claimed in claim 1, wherein each grid has its length, width, and height at a dimension ratio $1:1:\sqrt{3}$, and the height of the grid represents a distance value measured in a thickness direction of the optical film.

4. The device as claimed in claim 1, wherein each opening of the imaging element is rectangular in cross section.

5. The device as claimed in claim 1, wherein the optical film has an incidence surface attached to the display surface of the display and has an exit surface opposite to the incidence surface, when the image light from the display is incident on the incidence surface of the optical film only within an angle range, the image light is allowed to pass through the optical film and the imaging element to produce the spatial image.

6. The device as claimed in claim 1, wherein the sensor unit is an infrared sensor unit.

7. The device as claimed in claim 6, wherein the infrared sensor unit is composed of a plurality of infrared emitters and a plurality of infrared receivers arranged next to each other, the plurality of infrared emitters emits infrared sensing lights to detect a position of an object, and the plurality of infrared receivers receive the reflected infrared sensing light, and the position of the object is determined based on time difference between the emission and reception of the infrared sensing lights.

8. The device as claimed in claim 1, wherein the sensor unit is composed of time of flight (ToF) sensors.

9. The device as claimed in claim 1, wherein the sensor unit is composed of millimeter wave (mmWave) radar sensors.

10. The device as claimed in claim 1, wherein the sensor unit detects a position of a finger in the sensing plane and accordingly sends a position data to the display such that the display executes actions corresponding to the position data.

11. The device as claimed in claim 1, wherein the optical film is configured to have a light-exit angle between −30 and 30 degrees.

* * * * *